US012711452B1

(12) United States Patent
Jayapalan et al.

(10) Patent No.: US 12,711,452 B1
(45) **Date of Patent: *Aug. 18, 2026**

(54) INTERACTION EFFECTIVENESS MEASUREMENTS

(71) Applicant: United Services Automobile Association (USAA), San Antonio, TX (US)

(72) Inventors: Vijay Jayapalan, San Antonio, TX (US); Jeffrey David Calusinski, San Antonio, TX (US); Gregory B. Yarbrough, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 103 days.

This patent is subject to a terminal disclaimer.

(21) Appl. No.: 18/774,802

(22) Filed: Jul. 16, 2024

Related U.S. Application Data

(63) Continuation of application No. 18/344,853, filed on Jun. 30, 2023, now Pat. No. 12,067,520, which is a continuation of application No. 17/100,575, filed on Nov. 20, 2020, now Pat. No. 11,734,638.

(60) Provisional application No. 62/939,492, filed on Nov. 22, 2019.

(51) Int. Cl.

| | |
|---|---|
| ***G06Q 30/02*** | (2023.01) |
| ***G06Q 10/0639*** | (2023.01) |
| ***G06Q 30/016*** | (2023.01) |
| ***G10L 15/08*** | (2006.01) |
| ***H04M 3/51*** | (2006.01) |

(52) U.S. Cl.
CPC ..... *G06Q 10/06398* (2013.01); *G06Q 30/016* (2013.01); *G10L 15/08* (2013.01); *H04M 3/5175* (2013.01); *H04M 3/5183* (2013.01)

(58) Field of Classification Search
CPC ........... G06Q 10/06398; G06Q 30/016; G10L 15/08; H04M 3/5175; H04M 3/5183
USPC ....... 705/7.42, 11, 304; 379/37, 265.09, 309
See application file for complete search history.

(56) References Cited

U.S. PATENT DOCUMENTS

| | | |
|---|---|---|
| 6,879,685 B1 | 4/2005 | Peterson et al. |
| 2015/0046514 A1 | 2/2015 | Madan et al. |
| 2018/0007204 A1 | 1/2018 | Klein et al. |

*Primary Examiner* — Rasha S Al Aubaidi
(74) *Attorney, Agent, or Firm* — Perkins Coie LLP

(57) ABSTRACT

A system for measuring effectiveness of a customer service platform comprises a server configured to receive a first set of data related to an interaction between a first person and an automated communication channel, receive a second set of data related to a conversation between the first person and a second person on a call, determine, from the first set of data, a third set of word(s) that describe an intent of the first person to perform a task via the customer service platform, determine, from the second set of data, a fourth set of word(s) that describes an outcome accomplished during the call, calculate a value that describes a similarity between the third set of word(s) and the fourth set of word(s), and determine an effectiveness measure of the customer service platform based at least in part on a comparison of the value with a pre-determined threshold.

20 Claims, 3 Drawing Sheets

INTERACTION EFFECTIVENESS MEASUREMENTS

CROSS-REFERENCE TO RELATED APPLICATIONS

This application is a continuation of U.S. patent application Ser. No. 18/344,853, filed Jun. 30, 2023, now allowed, entitled "INTERACTION EFFECTIVENESS MEASUREMENTS," which is a continuation of U.S. patent application Ser. No. 17/100,575, filed Nov. 20, 2020, now U.S. Pat. No. 11,734,638, entitled "INTERACTION EFFECTIVENESS MEASUREMENTS," which is a non-provisional of and claims priority to U.S. Provisional Application No. 62/939,492, filed on Nov. 22, 2019, entitled "INTERACTION EFFECTIVENESS MEASUREMENTS," both of which are hereby incorporated by reference in their entirety for all purposes.

TECHNICAL FIELD

This disclosure is directed generally to systems, methods, and apparatus for measuring effectiveness of tasks performed via a customer service platform.

BACKGROUND

When a person calls an organization's customer service phone number, he or she is routed to a customer service representative. To talk to the customer service representative, the call routing system may request the person identify the reason for his or her call. The call routing system may also request the person to enter identifying information about him or her, such as a member number or a birthdate. After the person enters the requested information, the call routing system typically routes the person to the next available customer service representative.

Figure 1:
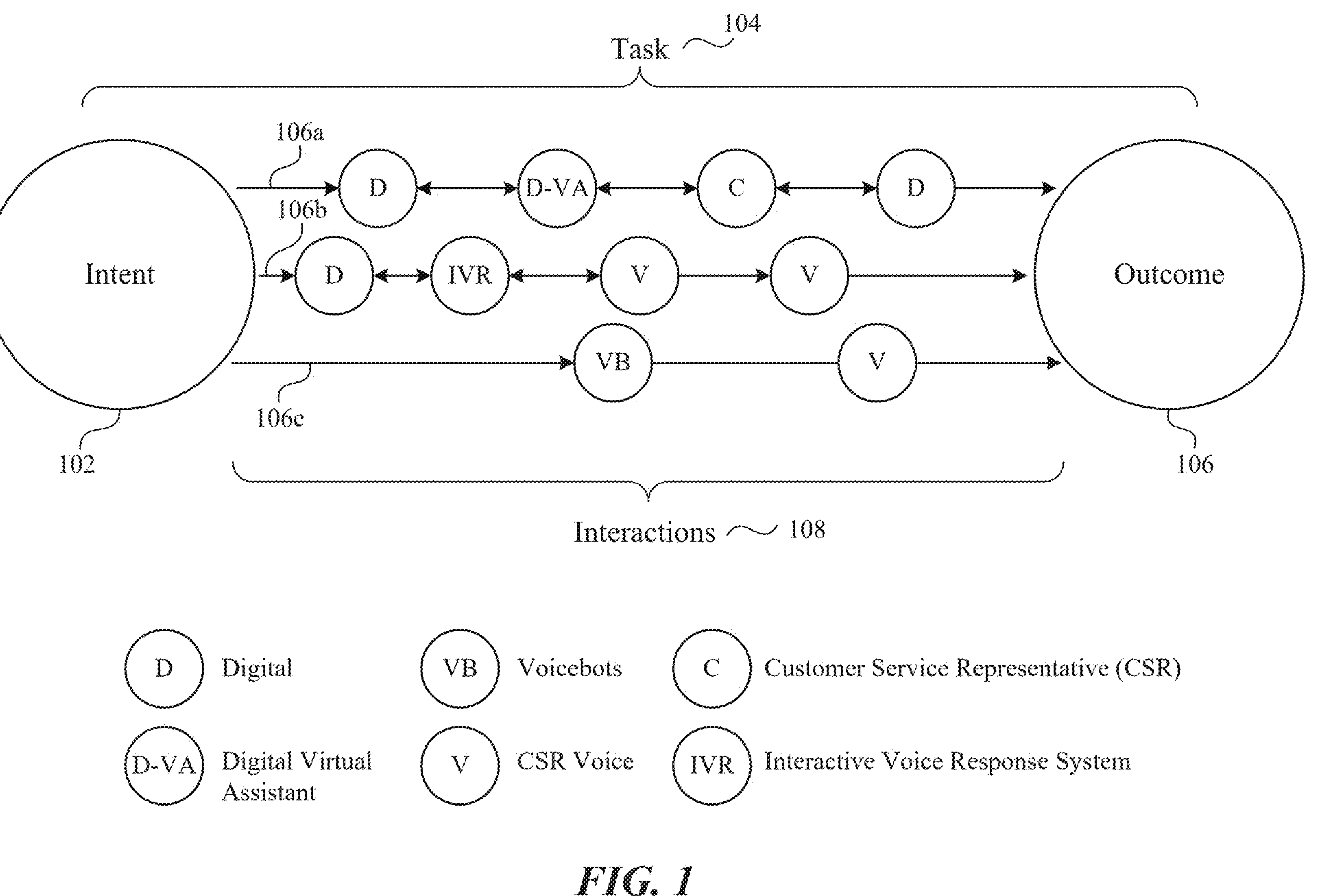
FIG. 1 shows a schematic overview of a task-oriented customer service platform.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Customer service platforms are designed to route a customer to an appropriate customer service representative (CSR), so that the CSR can help the customer to meet his or her goal. Conventional customer service platforms tend to qualitatively measure whether the customer met his or her goal. For example, a qualitative description may include whether a "ticket" generated by a CSR for a customer was marked as being "closed" within a certain length of time. In another example, the customer may be presented with a survey after the call with the goal of understanding whether the customer had a "good" or "bad" experience. Thus, the effectiveness of conventional customer service platforms tends to be described in qualitative terms. Other techniques for qualitatively measuring existing customer service platforms include: Y-cording (i.e., live listening by a coach or supervisor to gauge effectiveness); quality assurance call sampling to gauge effectiveness on courtesy, satisfaction, sentiment; targeted call studies on first call resolution and complaints; and multiple voice of the customer measurement strategies such as focus groups. To overcome at least such qualitative and labor intensive techniques, this patent document describes systems, methods, and apparatus for measuring effectiveness of tasks performed via a task-oriented customer service platform. The technology described herein provides numerous benefits and technological improvements including a technique to quantify effectiveness of communications over different channels.

FIG. 1 shows a schematic overview of a task-oriented customer service platform. A task 104 may include a collection of intent 102, interactions 108 and outcome 106. A task 104 originates with an intent 102 of a person that initiates communication via the customer service platform and terminates at an outcome 106 with multiple interactions 108 in between. Each interaction 108 can have its own intent 102 and outcome 106. An intent 102 may describe a primary purpose of the interactions 108 and the intent 102 can often be the origin of the task 104. The outcome can include a state where further interactions associated with the task can be predicted (e.g., CSR will call when approval is received, the claim is closed and no further interactions are predicted). For example, a person may initiate a chat with a virtual digital assistant (or non-human) via a messaging service to change his or her address with a bank. In this example, the person's intent is to change his or her address which can be resolved by the digital assistant transferring the chat to a live CSR who can change the person's address based on additional information that verifies the person's identity. The interactions 108 may include a set of activities performed by the person (e.g., customer) and a digital (e.g., interactive voice response (IVR) system) or human participant (e.g., CSR) to advance the primary intent towards an outcome 106. A fulfillment can be defined as producing an outcome 106 related to the task 104.

The multiple lines 106*a*-106*c* show multiple modes of communication through which persons can perform their tasks 104. Each line shown in FIG. 1 can include multiple communication entities through which a person can interact or communicate to fulfill his or her task. As shown in FIG. 1, a person may perform a single attempt to fulfill his or her intent via line 106*b* that includes, in an order, an interaction with a digital channel (e.g., webpage), a call to a call enter that is answered first by an IVR that transfers the call to a first CSR (indicated by the first "V") who may transfer the call to a second CSR (indicated by the second "V"). In line 106*b*, the second CSR can help the person calling the call center to an outcome 106 (e.g., opening a bank account) that is desired by the person. A person's interaction with a digital (human e.g., chat or non-human e.g., chatbot) and a non-digital communication with a human (e.g., phone call) within a single attempt to fulfill an intent can be considered an omni-channel interaction.

The legend shown on the bottom of FIG. 1 shows some examples of the multiple communication entities. An example of a communication entity operating in the task-oriented customer service platform includes a call system operated by humans shown as “CSR Voice” in FIG. 1. Another example of a communication entity includes a “digital” entity such as a webpage through which a customer can communicate with the task-oriented customer service platform. Some other examples of communication entities include a digital voice assistant on a webpage or an IVR system through which a person can speak to provide his or her reason for calling the call center, a CSR chat or messaging channel, voice-bots, etc., In FIG. 1, the communication entities of the task-oriented customer service platform are loosely defined as participants associated with a task. The participants may include the customer, self-service channels, and customer service representatives.

This patent document describes a task-oriented customer service platform server that can quantize (or numerally characterize) different portions of a task 104 across multiple participants (or communication entities). The server may include a semantic analysis module (shown as 364 in FIG. 3) used include semantic generation of a participant state, semantic representation of a participant state and semantic evaluation between participant states. The process of quantization may include the semantic analysis module performing a semantic state generation (or semantic representation) and semantic evaluation (or semantic textual similarity) of two or more independent representations associated with an intent. Semantic state generation is used to express a person’s interaction activity in communication entities (e.g., digital interactions or call with CSR) in natural language. Semantic evaluation is performed on two or more semantic representations.

An example is provided below to further explain the techniques used by the semantic analysis module to perform semantic representation and semantic evaluation. In one example, a person may have an IVR interaction through which the person speaks certain keywords that can lead the IVR to direct the person to a CSR whereupon the person interacts with a live CSR on a phone call. In this example, the semantic analysis module may obtain a first semantic representation by generating a set of words of the conversation between the person and IVR, and the semantic analysis module may obtain a second semantic representation by generating another set of words of the conversation between person and CSR. A semantic evaluation can then be performed by the semantic analysis module between the two sets of words using multiple techniques such as semantic textual similarity that measure distance between two semantic representation of texts or using entailment models associated with an intent or using pre-computed priors of similar tasks. Based on the evaluation technique a gradation can then be applied across various interactions within a task.

In the example mentioned above, a high similarity between IVR interaction and CSR interaction is a positive measure of movement towards advancing towards the outcome associated with an intent. Alternately low similarity could signal context leakage or lack of context. High similarity between interactions within a same attempt (two CSRs operating on the same caller intent) could indicate repetition or context leakage. The computed similarity could be calibrated against similar tasks and interactions to provide a scaled metric.

The semantic analysis module may perform semantic representation using, for example, techniques described in Pretraining-Based Natural Language Generation for Text Summarization by Haoyu Zhang et al (arXiv:1902.09243v2 [cs.CL] 12 Apr. 2019), and/or Abstractive Meeting Summarization with Entailment and Fusion by Yashar Mehdad et al (Proceedings of the 14th European Workshop on Natural Language Generation, pages 136-146, Sofia, Bulgaria, Aug. 8-9 2013).

The semantic analysis module may perform the semantic evaluation using for example, techniques described in Learning Semantic Textual Similarity from Conversations by Yinfei Yang et al. (Proceedings of the 3rd Workshop on Representation Learning for NLP, pages 164-174 Melbourne, Australia, Jul. 20, 2018), and/or Sentence-Level Semantic Textual Similarity Using Word-Level Semantics by Md Shajalal et al (113-116. 10.1109/ICECE.2018.8636779, 10th International Conference on Electrical and Computer Engineering 20-22 Dec. 2018, Dhaka, Bangladesh). The entire contents of the documents identified above is incorporated herein for all purposes.

Figure 2:
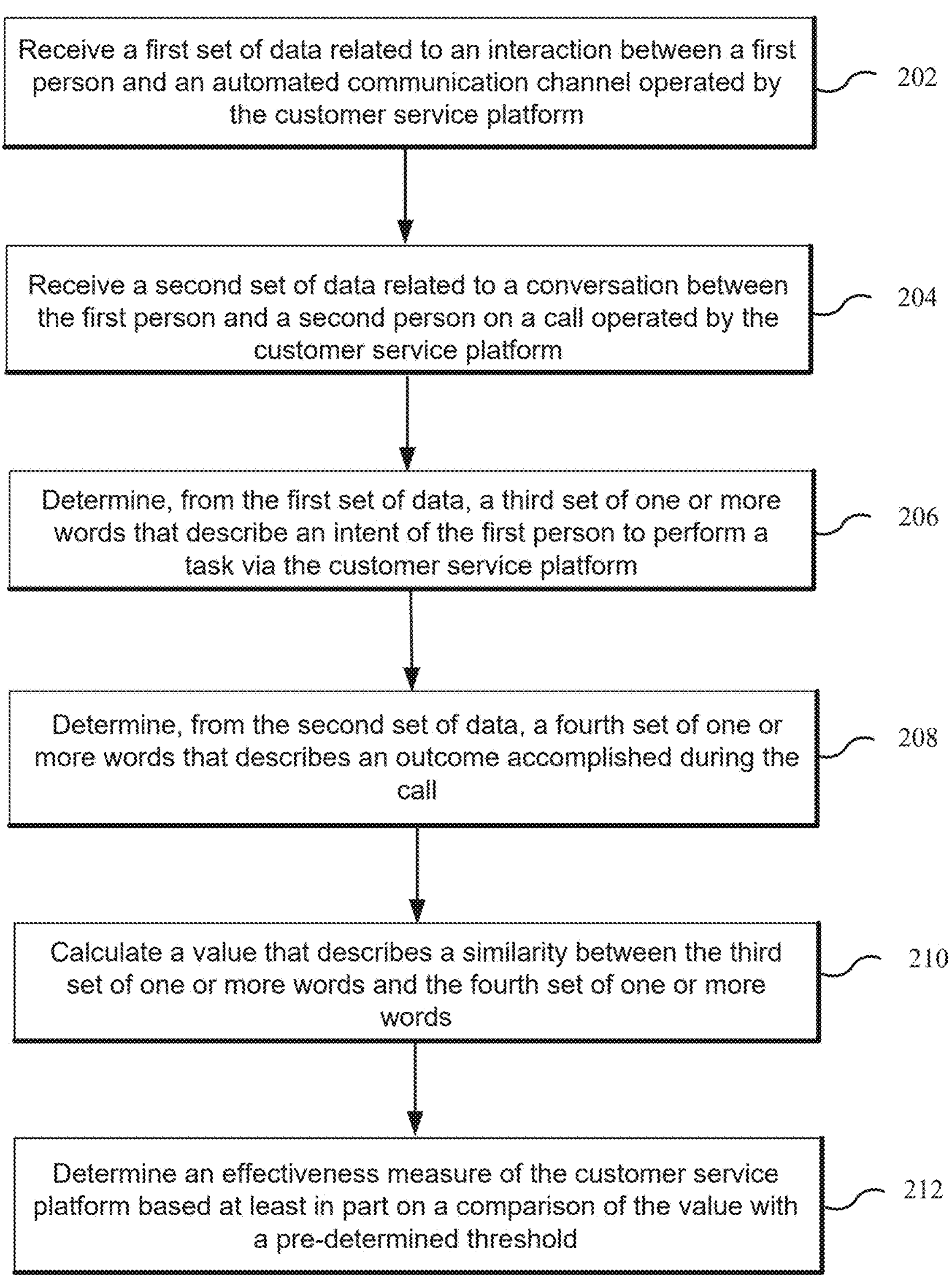
FIG. 2 shows an example flow chart for measuring effectiveness of a customer service platform.

FIG. 2 shows an example flow chart for measuring effectiveness of a customer service platform. Operations 202 to 212 are performed by a semantic analysis module of a task-oriented customer service platform server. At operation 202, the semantic analysis module receives a first set of data related to an interaction between a first person and an automated communication channel operated by a customer service platform. An automated communication channel may be a communication entity described in FIG. 1 that is operated to interact with the first person without human involvement (e.g., a digital virtual assistant, a webpage chatbot, an IVR system, or a voice-bot). The first set of data includes words recorded from the first person while the first person interacts with the automated communication channel.

At operation 204, the semantic analysis module receives a second set of data related to a conversation between the first person and a second person on a call operated by the customer service platform. The call may be a regular telephone call, cellular phone call, or a voice over-IP (VOIP) call. The second set of data includes words recorded from the first person and the second person during the call. Thus, the first and second set of data may be considered raw data of the interaction or the communication that the first person had with an automated or a live person. Such raw data may be further analyzed in operations 206-212.

In many situations, the interaction between the person and the automated communication channel precedes the conversation between the first person and the second person on the call. For example, when a person calls a call center, an automated IVR system may pick up the call and ascertain the person’s intent for the call by asking the person to provide a few words that describe his or her reason for the call, the IVR system determines an appropriate CSR based on the reason provided by the person and then transfers the call to a live CSR to help the person with his or her reason.

At operation 206, the semantic analysis module determines, from the first set of data, a third set of one or more words that describe an intent of the first person to perform a task via the customer service platform. At operation 208, the semantic analysis module determines, from the second set of data, a fourth set of one or more words that describes an outcome accomplished during the call. The third set of one or more words and the fourth set of one or more words are obtained by the semantic analysis module of the server by summarizing information from the first set of data and the second set of data, respectively. In some embodiments, the semantic analysis module may perform semantic representation on the first set of data and the second set of data to summarize the information as described in this patent document.

At operation 210, the semantic analysis module calculates a value that describes a similarity between the third set of one or more words and the fourth set of one or more words. In some embodiments, the semantic analysis module can calculate the value to describe the similarity between the two sets of words by employing a semantic evaluation (or semantic textual similarity) technique described in this patent document between the third set of one or more words and the fourth set of one or more words.

At operation 212, the semantic analysis module can determine an effectiveness measure of the customer service platform based at least in part on a comparison of the value with a pre-determined threshold. For example, if a value obtained at operation 210 is 0.8 (out of a possible score of 1), and if the pre-determined threshold is set at 0.6, then the semantic analysis module can determine that the calculated value exceeding the pre-determined threshold indicates that the customer service platform is effective. In an example implementation, the effectiveness measure may include as an output the term "effective" if the calculated value is greater than the pre-determined threshold, or the term "ineffective" if the calculated value is less than the pre-determined threshold.

In some embodiments, if the semantic analysis module determines that the first person performed a previous call with a same intent as the intent on the call, then the semantic analysis module can change the effectiveness measure to "ineffective" to indicate that a person called on more than one occasion within a pre-determined time period for the same reason. An "ineffective" measure can indicate that the person's intent on the previous call was not met. For example, the semantic analysis module determines that the first person performed a previous call with a same intent as the intent on the call by being configured to receive a fifth set of data related to a previous conversation between the first person and a third person on the previous call operated by the customer service platform, where the fifth set of data includes words recorded from the first person and the third person during the previous call. In such embodiments, the semantic analysis module also determines, from the fifth set of data, a sixth set of one or more words that describe the intent of the first person to perform the task via the customer service platform, and calculates a second value that describes a similarity between the third set of one or more words and the sixth set of one or more words, where the similarity indicated by the second value indicates that the first person interacted with the customer service platform to perform the same intent on the call and the previous call.

In some embodiments, the semantic analysis module can rank the value in a list of values that describe similarities between intents and outcomes on the call and on other calls. The value may be ranked according to a length of time of the conversation between the first person and the second person on the call. A ranking may indicate a relative effectiveness of a CSR on a call. For example, a rank can indicate that a first CSR accomplished a task within one-standard deviation of the average time needed by multiple CSRs to handle the same type of intent as that handled by the first CSR. In this example, the semantic analysis module can determine that the effectiveness measure of the first CSR's performance is "effective."

In some embodiments, the automated communication channel includes an interactive voice response system, a chat or messaging channel, or a virtual assistant operated on a webpage, where the automated communication channel is operated without human involvement. In some embodiments, the semantic analysis module can display the rank, effectiveness measure, and/or values computed for a CSR so that such metrics can be used to improve or guide CSR performance.

The example described above includes an automated communication channel as the first channel and a voice call as the second channel. However, the technology contemplates other variations. For example, the first channel can include chat from a representative and the second channel can include an email from the customer.

Figure 3:
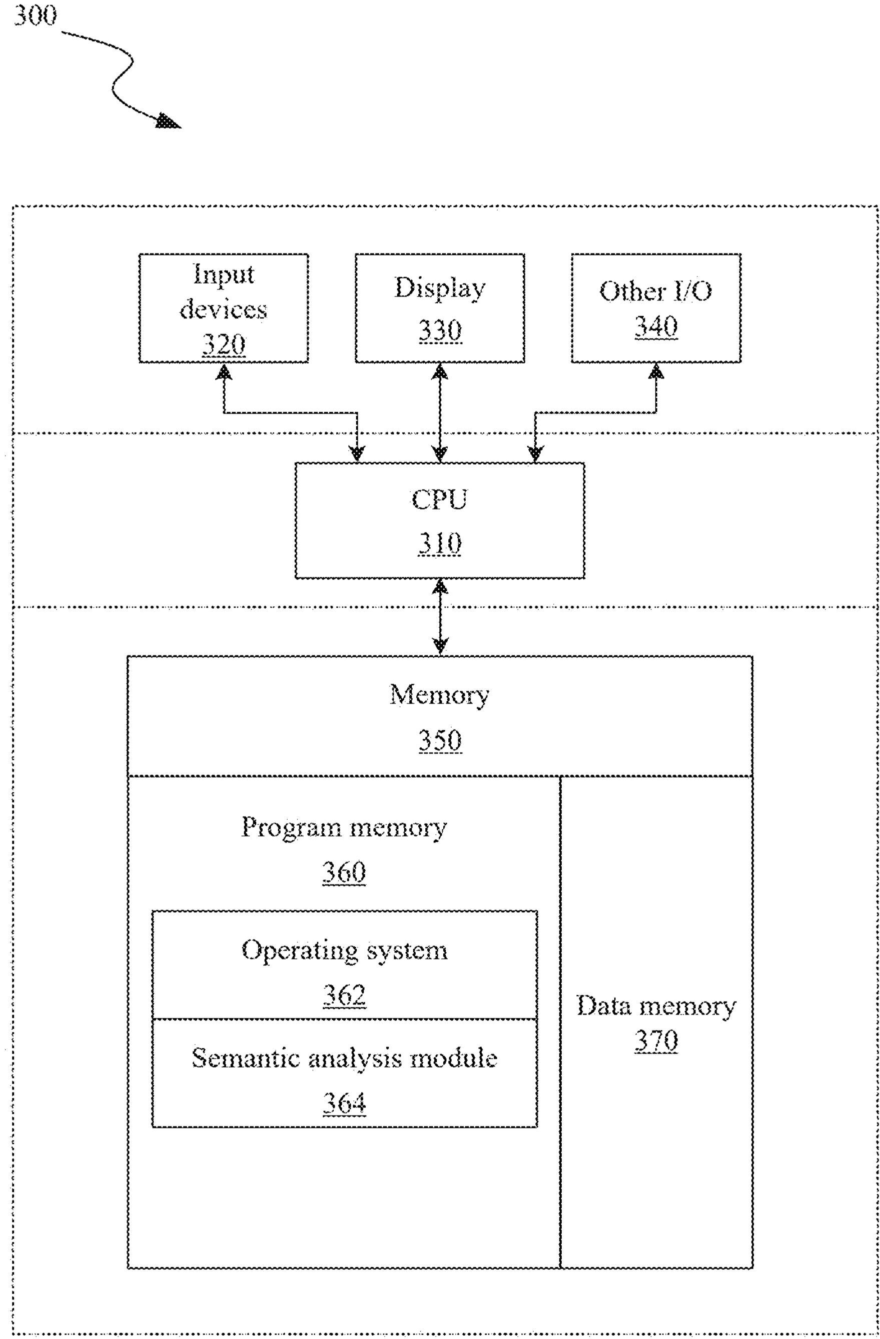
FIG. 3 is a block diagram illustrating an overview of devices on which some implementations of a task-oriented customer service platform server can operate.

FIG. 3 is a block diagram illustrating an overview of devices on which some implementations of the task-oriented customer service platform server can operate. The devices can comprise hardware components of a device 300, such as the task-oriented customer service platform server that includes a semantic analysis module 364 that can perform semantic representation and semantic evaluation as further described in this patent document. Device 300 can include one or more input devices 320 that provide input to the CPU (processor) 310, notifying it of actions. The actions are typically mediated by a hardware controller that interprets the signals received from the input device and communicates the information to the CPU 310 using a communication protocol. Input devices 320 include, for example, a mouse, a keyboard, a touchscreen, an infrared sensor, a touchpad, a wearable input device, a camera- or image-based input device, a microphone, or other user input devices.

CPU 310 can be a single processing unit or multiple processing units in a device or distributed across multiple devices. CPU 310 can be coupled to other hardware devices, for example, with the use of a bus, such as a PCI bus or SCSI bus. The CPU 310 can communicate with a hardware controller for devices, such as for a display 330. Display 330 can be used to display text and graphics. In some examples, display 330 provides graphical and textual visual feedback to a person operating the device 300. In some implementations, display 330 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 340 can also be coupled to the processor, such as a network card, video card, audio card, USB, FireWire or other external device, camera, printer, speakers, CD-ROM drive, DVD drive, disk drive, or Blu-Ray device.

In some implementations, the device 300 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 300 can utilize the communication device to distribute operations across multiple network devices.

The CPU 310 can have access to a memory 350. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 350 can include program memory 360 that stores programs and software, such as an operating system 362 and semantic analysis module 364. The semantic analysis module may perform operations described in FIG. 2 and in the various embodiments described in this patent document. Thus, for example, the memory 350 may store instructions that upon execution by CPU 310 configure the device 300 to perform the operations described for the call routing server in FIGS. 1 to 2 and/or in the various embodiments described in this patent document. Memory 350 can also include data memory 370 that can include the values and determination of effectiveness described in this patent document, which can be provided to the program memory 360 or any element of the device 300.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-3 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method comprising:

receiving, via a digital channel of an omni-channel customer service platform, a first indication of a user to perform a task;

transferring, by the omni-channel customer service platform, the user from the digital channel to a virtual assistant channel operated by the omni-channel customer service platform to perform the task; and in response to receiving, within a time threshold of transferring the user to the virtual assistant channel, receiving a second indication of the user via the digital channel of the omni-channel customer service platform to perform the task, determining an effectiveness measure of the virtual assistant channel that indicates the task was not performed, transferring the user from the digital channel to a voice-based communication channel for a voice call with a customer service representative, and displaying the effectiveness measure on a device associated with the customer service representative.

2. The method of claim 1, further comprising:

calculating a value that describes a similarity between text of the digital channel and text associated with the virtual assistant channel; and determining the effectiveness measure based on A) a comparison of the value with a pre-determined threshold and B) a length of time of the user interacting with the virtual assistant channel.

3. The method of claim 1, further comprising:

determining one or more words in text of the digital channel that describe an intent of the user to perform the task via the omni-channel customer service platform.

4. The method of claim 1, further comprising:

generating a first semantic representation associated with the digital channel based on a first set of words of the user communicated via the digital channel;

generating a second semantic representation associated with the virtual assistant channel based on a second set of words of the user communicated via the virtual assistant channel;

measuring a distance between the first semantic representation and the second semantic representation; and determining a value that describes a similarity between the first set of words of the digital channel and the second set of words associated with the virtual assistant channel.

5. The method of claim 1, further comprising:

generating a summary of information from a first set of data from the digital channel and a second set of data from the virtual assistant channel.

6. The method of claim 1, further comprising:

calculating a value that describes a similarity between text of the virtual assistant channel and text associated with the voice-based communication channel; and determining an updated effectiveness measure based on A) a comparison of the value with a pre-determined threshold and B) a length of time of the user interacting with the customer service representative.

7. The method of claim 1, wherein the digital channel is operated without human involvement.

8. A system comprising:

one or more processors; and one or more memories storing instructions that, when executed by the one or more processors, cause the system to perform a process comprising:

receiving, via a digital channel of an omni-channel customer service platform, a first indication of a user to perform a task;

transferring, by the omni-channel customer service platform, the user from the digital channel to a virtual assistant channel operated by the omni-channel customer service platform to perform the task; and in response to receiving, within a time threshold of transferring the user to the virtual assistant channel, receiving a second indication of the user via the digital channel of the omni-channel customer service platform to perform the task, determining an effectiveness measure of the virtual assistant channel that indicates the task was not performed, transferring the user from the digital channel to a voice-based communication channel for a voice call with a customer service representative, and displaying the effectiveness measure on a device associated with the customer service representative.

9. The system of claim 8, wherein the process further comprises:

calculating a value that describes a similarity between text of the digital channel and text associated with the virtual assistant channel; and determining the effectiveness measure based on A) a comparison of the value with a pre-determined threshold and B) a length of time of the user interacting with the virtual assistant channel.

10. The system of claim 8, wherein the process further comprises:

determining one or more words in text of the digital channel that describe an intent of the user to perform the task via the omni-channel customer service platform.

11. The system of claim 8, wherein the process further comprises:

generating a first semantic representation associated with the digital channel based on a first set of words of the user communicated via the digital channel;

generating a second semantic representation associated with the virtual assistant channel based on a second set of words of the user communicated via the virtual assistant channel;

measuring a distance between the first semantic representation and the second semantic representation; and determining a value that describes a similarity between the first set of words of the digital channel and the second set of words associated with the virtual assistant channel.

12. The system of claim 8, wherein the process further comprises:

generating a summary of information from a first set of data from the digital channel and a second set of data from the virtual assistant channel.

13. The system of claim 8, wherein the process further comprises:

calculating a value that describes a similarity between text of the virtual assistant channel and text associated with the voice-based communication channel; and determining an updated effectiveness measure based on A) a comparison of the value with a pre-determined threshold and B) a length of time of the user interacting with the customer service representative.

14. The system of claim 8, wherein the digital channel is operated without human involvement.

15. A non-transitory computer-readable medium storing instructions that, when executed by a computing system, cause the computing system to perform operations comprising:

receiving, via a digital channel of an omni-channel customer service platform, a first indication of a user to perform a task;

transferring, by the omni-channel customer service platform, the user from the digital channel to a virtual assistant channel operated by the omni-channel customer service platform to perform the task; and in response to receiving, within a time threshold of transferring the user to the virtual assistant channel, receiving a second indication of the user via the digital channel of the omni-channel customer service platform to perform the task, determining an effectiveness measure of the virtual assistant channel that indicates the task was not performed, transferring the user from the digital channel to a voice-based communication channel for a voice call with a customer service representative, and displaying the effectiveness measure on a device associated with the customer service representative.

16. The non-transitory computer-readable medium of claim 15, wherein the operations further comprise:

calculating a value that describes a similarity between text of the digital channel and text associated with the virtual assistant channel; and determining the effectiveness measure based on A) a comparison of the value with a pre-determined threshold and B) a length of time of the user interacting with the virtual assistant channel.

17. The non-transitory computer-readable medium of claim 15, wherein the operations further comprise:

determining one or more words in text of the digital channel that describe an intent of the user to perform the task via the omni-channel customer service platform.

18. The non-transitory computer-readable medium of claim 15, wherein the operations further comprise:

generating a first semantic representation associated with the digital channel based on a first set of words of the user communicated via the digital channel;

generating a second semantic representation associated with the virtual assistant channel based on a second set of words of the user communicated via the virtual assistant channel;

measuring a distance between the first semantic representation and the second semantic representation; and determining a value that describes a similarity between the first set of words of the digital channel and the second set of words associated with the virtual assistant channel.

19. The non-transitory computer-readable medium of claim 15, wherein the operations further comprise:

generating a summary of information from a first set of data from the digital channel and a second set of data from the virtual assistant channel.

20. The non-transitory computer-readable medium of claim 15, wherein the operations further comprise:

calculating a value that describes a similarity between text of the virtual assistant channel and text associated with the voice-based communication channel; and determining an updated effectiveness measure based on A) a comparison of the value with a pre-determined threshold and B) a length of time of the user interacting with the customer service representative.

* * * * *